US012768821B2

(12) United States Patent
Panda et al.

(10) Patent No.: US 12,768,821 B2
(45) Date of Patent: Oct. 20, 2026

(54) METHOD FOR SEPARATION AND QUANTITATION OF HEAVY POLYCYCLIC AROMATIC HYDROCARBONS (HPAHS) USING AROMATIC-SELECTIVE SIZE EXCLUSION CHROMATOGRAPHY

(71) Applicant: SAUDI ARABIAN OIL COMPANY, Dhahran (SA)

(72) Inventors: Saroj Kumar Panda, Dhahran (SA); Ahmed M. Aldawood, Safwa (SA); Omer Refa Koseoglu, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 521 days.

(21) Appl. No.: 18/475,910

(22) Filed: Sep. 27, 2023

(65) Prior Publication Data

US 2025/0102476 A1 Mar. 27, 2025

(51) Int. Cl.

*G01N 30/02* (2006.01)
*G01N 30/06* (2006.01)
*G01N 30/62* (2006.01)
*G01N 30/88* (2006.01)

(52) U.S. Cl.

CPC ............ *G01N 30/06* (2013.01); *G01N 30/62* (2013.01); *G01N 30/88* (2013.01); *G01N 2030/027* (2013.01); *G01N 2030/8854* (2013.01)

(58) Field of Classification Search

CPC .. G01N 30/06; G01N 30/88; G01N 2030/027; G01N 2030/8854
See application file for complete search history.

(56) References Cited

U.S. PATENT DOCUMENTS

| | | | | |
|---|---|---|---|---|
| 8,951,308 | B2 | 2/2015 | Ellis et al. | |
| 10,449,502 | B2 | 10/2019 | Rovani, Jr. et al. | |
| 10,920,157 | B2 | 2/2021 | Koseuglu | |
| 10,934,493 | B1 | 3/2021 | Elomari et al. | |
| 11,597,884 | B2 | 3/2023 | Dubreuil et al. | |
| 2005/0106741 | A1 | 5/2005 | Dijke | |
| 2013/0172639 | A1 * | 7/2013 | Yanagawa ................ | B01J 35/40 585/251 |
| 2015/0107151 | A1 | 4/2015 | Ellis | |
| 2022/0064550 | A1 | 3/2022 | Guillon et al. | |
| 2022/0081628 | A1 | 3/2022 | Dubreuil et al. | |

(Continued)

FOREIGN PATENT DOCUMENTS

| | | | |
|---|---|---|---|
| CN | 104569193 A | * | 4/2015 |
| CN | 109668993 A | | 4/2019 |

(Continued)

OTHER PUBLICATIONS

Gong et al—CN 104569193 A machine translation—Apr. 29, 2015 (Year: 2015).*

(Continued)

*Primary Examiner* — Bradley R Spies
(74) *Attorney, Agent, or Firm* — Leason Ellis LLP

(57) ABSTRACT

Heavy polycyclic aromatic hydrocarbons (HPAHs) are analyzed using aromatic-selective size exclusion chromatography for the separation and quantitation of HPAHs. This method is suitable to determine the concentration of HPAHs in mixtures that include coronene and other HPAHs including 8 or more rings, such as contained in hydrocracker bottoms, or in pyrolysis oil or tar.

20 Claims, 7 Drawing Sheets

(56) References Cited

U.S. PATENT DOCUMENTS

| | | | |
|---|---|---|---|
| 2022/0112435 | A1 | 4/2022 | Dubreuil et al. |
| 2022/0204873 | A1 | 6/2022 | Jiao et al. |

FOREIGN PATENT DOCUMENTS

| | | | |
|---|---|---|---|
| CN | 111272932 | A | 6/2020 |
| CN | 113125592 | B | 7/2021 |
| EP | 0632267 | A1 | 1/1995 |

OTHER PUBLICATIONS

UOP Method 860-05; Heavy Polynuclear Aromatics (HPNA) in Petroleum Fractions by Fluorescence Spectroscopy; no date provided.

Latif; Polynuclear Aromatic Formation in Hydrocracker Abd Their Impact On Catalyst Stability; Catalysts in Petroleum Refining 1989.

Andersson; Pah or Pac, That Is The Question; Polycyclic Aromatic Compounds 29 (2009).

Panda et al.; Size exlusion chromatography of aromatic compounds in high-biling petroleum samples; Journal of Chromatography; 2021.

Panda et al.; Determination of heavy polycyclic aromatic hydrocarbons by non-aqueous reversed phase liquid chromatography: Application and limitation in refining steams; Journal of Chromatography; 2018.

Fetzer at al.; Liquid Chromatographic Retention Behavior of Large, Fused Polycyclic Aromatics; Journal of Chromatography; 1985.

Panda et al.; Aromatic-selective size exclusion chromatography (ASSEC): How quantitative is it for petroleum aromatics? Elsevier; 2023.

Panda et al.: Aromatic-selective size exclusion chromatography: A new dimention in petroleum characterization; Elsevier; 2022.

Panda et al.; Size exclusion chromatography of petroleum samples using amino-boned silica phase; Elsevier; 2021.

Alawani et al.; Evaluation of Polycyclic Aromatic Hydrocarbon Removal from Hydrocracking Recycle Streams; Energy & Fuels 2020.

Fetzer et al; Retention Behavior of Large Polycyclic Aromatics in Bonded-Phase High-Performance Liquid Chromatography; Journal of Chromatography; 1987.

Parris; Non-Aqueous Reversed-phase Liquid Chromatography. A Neglected Approach to the Analysis of Low Polarity Samples; Journal of Chromatography; 1978.

Natusch et al.; Isolation of Polycyclic Organic Compounds by Solvent Extraction with Dimethyl Sulfoxide; Analytical Chemistry, vol. 50, No. 11. Sep. 1978.

Zhang et al.; Analysis of polynuclear aromatic hydrocarbons in heavy products derived from a coal and petroleum by high performance liquid chromatography. Elsevier; Journal of Chromatography; 2007.

* cited by examiner

| HPAH | Number of aromatic rings/DBE | Structure |
|---|---|---|
| benzoperylene | 6/17 |  |
| coronene | 7/19 |  |
| methylcoronene | 7/19 |  |
| naphthenocoronene | 7/20 |  |
| naphthocoronene | 9/24 |  |
| ovalene | 10/26 |  |

METHOD FOR SEPARATION AND QUANTITATION OF HEAVY POLYCYCLIC AROMATIC HYDROCARBONS (HPAHS) USING AROMATIC-SELECTIVE SIZE EXCLUSION CHROMATOGRAPHY

FIELD OF THE DISCLOSURE

The present disclosure relates to methods using aromatic-selective size exclusion chromatography for separation and quantitation of heavy polycyclic aromatic hydrocarbon(s).

BACKGROUND OF THE DISCLOSURE

Polycyclic aromatic hydrocarbons ("PAHs") and heavy polycyclic aromatics hydrocarbons (HPAHs) (also referred to as heavy polynuclear aromatic compounds) are organic compounds containing only carbon and hydrogen comprising fused aromatic rings, that is, rings that share one or more sides. The PAHs with 2-6 rings and their alkylated derivatives are found in straight-run vacuum gas oils (VGOs) and are precursors for the formation of heavy polycyclic aromatic hydrocarbons (HPAHs) in the hydrocracking, steam cracking and/or thermal cracking processes. The HPAHs formed in these processes have seven or more rings such as coronene and ovalene. The HPAHs are high boiling compounds concentrated in the recycle stream (fractionator bottom) of a hydrocracking unit. This unconverted material is recycled back to the hydrocracking unit for extinction to achieve full conversion. The HPAHs also form in pyrolysis oil derived from steam cracking, a high temperature process typically used to crack C2-C6 paraffinic hydrocarbons. Fourier transform mass spectrometry shows that the HPAHs in pyrolysis oil have DBE values ranging from 4 (monoaromatics) to 30 (10 or more aromatic rings), with the average alkyl number in the range of 2-6.

HPAHs are thermodynamically stable and accumulate in the hydrocracker recycle streams over time. The buildup of HPAHs causes two major problems in hydrocracker operations: (1) catalyst deactivation, and (2) deposition in the downstream of the reactor such as in feed effluent exchangers and air coolers. The HPAHs formed in the hydrocracking, steam cracking and/or thermal cracking processes are relatively polar and have an affinity to adsorb on the catalyst surface and condense to form larger HPAHs by coking reactions, which results in rapid catalyst deactivation. The affinity for absorption on catalyst surfaces increases exponentially with increasing ring size. The HPAHs, which remain in solution at the reactor outlet conditions can precipitate when the thermodynamic conditions changes, such as temperature and/or pressure, resulting in fouling downstream of the hydrocracking reactor/separation vessel.

Certain methods to analyze HPAH(s) include spectroscopy, such as UOP Method 860-055 which uses fluorescence spectroscopy to determine HPAH containing 11+ ring aromatics. Other methods to analyze HPAH(s) include chromatographic methods. For instance, a gradient mode separation was carried out using HPLC to determine heavy polycyclic aromatic hydrocarbons containing 7+ aromatic rings using non-aqueous reversed phase liquid chromatography. The gradient mode separation requires use of two solvents (for example methanol and dichloromethane). However, a drawback of gradient mode separation is the interference of alkylated aromatic compounds during detection of HPAHs.

Therefore, a need exists for reliable and efficient analytical methods to determine the total HPAH concentration of certain streams in petroleum refinery or petrochemical operations.

SUMMARY OF THE DISCLOSURE

Heavy polycyclic aromatic hydrocarbons (HPAHs) are analyzed using aromatic-selective size exclusion chromatography for the separation and quantitation of HPAHs. This method is suitable to determine the concentration of HPAHs in mixtures that include coronene and other HPAHs including 8 or more rings, such as contained in hydrocracker bottoms, or in pyrolysis oil or tar.

In an embodiment, a method for separation and quantitation of heavy polycyclic aromatic hydrocarbons (HPAHs) in a sample is provided, comprising: providing the sample containing HPAHs, wherein HPAHs comprise polycyclic aromatics with at least 7 aromatic rings; diluting the sample in a sample dilution solvent by a dilution factor and filtering the diluted sample to recover a prepared sample solution; analyzing the prepared sample solution with a high-performance liquid chromatography (HPLC) system for aromatic-selective size exclusion chromatography (ASSEC), wherein the HPLC system comprises one or more HPLC columns packed with an amino-bonded silica stationary phase, an elution solvent, and an HPLC detector; wherein ASSEC includes introducing a mobile phase of the injected prepared sample solution and the elution solvent into the HPLC column, flowing the mobile phase through the amino-bonded silica stationary phase for separation of HPAHs through the HPLC column based on molecular affinity relative to the amino-bonded silica stationary phase and based on size exclusion relative to the pore dimensions and particle size of the amino-bonded silica stationary phase and relative to interstitial volume of the HPLC column, discharging sample elute as a sample analyte and measuring responses for at least one characteristic of the sample analyte with the HPLC detector, and obtaining a chromatogram of the sample analyte based on the measured responses by the HPLC detector; identifying one or more peaks of the chromatogram of the sample analyte associated with HPAH compounds; calculating a peak characteristic from the one or more peaks of the chromatogram of the sample analyte associated with HPAH compounds; calculating a concentration of HPAHs in the sample containing HPAHs with a HPAH standards function obtained from regression of peak characteristics of plural reference HPAH standard solutions each having a reference HPAH compound, and using the peak characteristic and the dilution factor. any of the embodiments herein, the reference HPAH compound may comprise coronene. In any of the embodiments herein, the HPAHs may comprise polycyclic aromatics with 7-50 aromatic rings.

In any of the embodiments herein, the HPAH standards function is determined obtaining HPLC chromatograms of the plural reference HPAH standard solutions at different concentrations, calculating standard peak characteristics from one or more peaks associated with the reference HPAH compound in each of chromatograms at different concentrations, and performing regression on the standard peak characteristics. For example, in certain embodiments the HPAH compounds in the sample comprise coronene and one or more additional polycyclic aromatics with at least 7 aromatic rings, and wherein the reference HPAH compound consists essentially of coronene. The different concentrations may comprise, for instance, at least two or three of 1 ppm, 10 ppm, and 100 ppm of refence sample relative to a refence sample dilution solvent, in certain embodiments comprising three concentrations. In certain embodiments, the regression is linear regression.

In any of the embodiments herein, the stationary media is selected from the group consisting of silica, amino-bonded silica and cyano-bonded silica. In any of the embodiments herein, the stationary media comprises amino-bonded silica.

In any of the embodiments herein, the sample peak characteristics and the standard peak characteristics comprise peak area, or the sample peak characteristics and the standard peak characteristics comprise peak height.

In any of the embodiments herein, the elution solvent has a polarity index (Rohrschneider's polarity parameter) in the range of about 3 to In any of the embodiments herein, the HPLC detector is an ultraviolet detector and the elution solvent is transparent to ultraviolet light at least between 235-400 nm. In any of the embodiments herein, the elution solvent has a dipole moment in the range of about 1.1 to about 1.3 D at 25° C. In any of the embodiments herein, the elution solvent has a Hildebrandt solubility parameter δ of at least about 20. In certain embodiments, the elution solvent comprises dichloromethane. In any of the embodiments herein, the elution solvent comprises dichloromethane and separation in the HPLC column is isocratic.

Any combinations of the various embodiments and implementations disclosed herein can be used. These and other aspects and features can be appreciated from the following description of certain embodiments and the accompanying drawings and claims.

BRIEF DESCRIPTION OF THE DRAWINGS

The invention will be described in further detail below and with reference to the attached drawings, and where.

DETAILED DESCRIPTION OF CERTAIN EMBODIMENTS OF THE DISCLOSURE

Heavy polycyclic aromatic hydrocarbons (HPAHs) are analyzed using aromatic-selective size exclusion chromatography for the separation and quantitation (i.e., determination of concentration) of HPAHs. This method is suitable to determine the concentration of HPAHs in mixtures that include coronene and other HPAHs including 8 or more rings, such as contained in hydrocracker bottoms, pyrolysis oil or tar, or heavy fractions from a thermal residual oil cracking process in the presence or absence of hydrogen and/or water.

Figure 1:
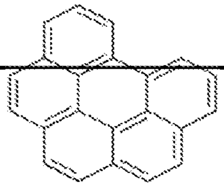
FIG. 1 is a table of exemplary HPAHs contained in samples for analysis in the methods herein.
Figure 1:
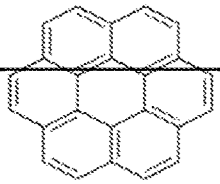
Figure 1:
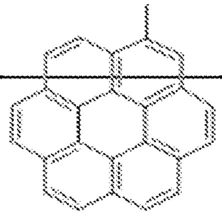
Figure 1:
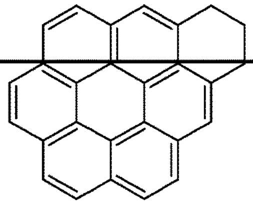
Figure 1:
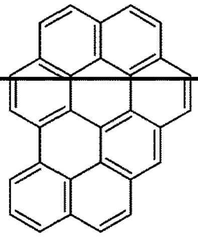
Figure 1:
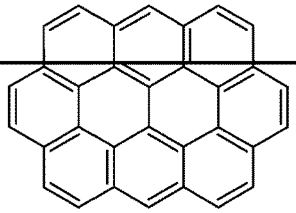

As used herein, heavy polycyclic aromatic hydrocarbon (s) ("HPAH(s)") and heavy polynuclear aromatic compound (s) ("HPNA compound(s) and the shorthand expression "HPNA(s)") may be used interchangeably and refer to fused polycyclic aromatic compounds having double bond equivalence (DBE) values of 19 and above, or having 7 or more rings, for example, 7-20, 7-25, 7-30 or 7-50 rings. HPAH compounds include but are not limited to coronenes ($C_{24}H_{12}$), benzocoronenes ($C_{28}H_{14}$), naphthocoronenes ($C_{30}H_{14}$) and ovalenes ($C_{32}H_{14}$). The aromatic structure may have alkyl groups or naphthenic rings attached to it. For instance, coronene has 24 carbon atoms and 12 hydrogen atoms and its double bond equivalency (DBE) is 19. DBE is calculated based on the sum of the number double bonds and number of rings. For example, the DBE value for coronene is 19 (7 rings+12 double-bonds). Examples of HPAHs are shown in FIG. 1.

The term "unconverted oil" and its acronym "UCO," also known as hydrocracker bottoms, hydrocracked bottoms, hydrocracker unconverted material, hydrocracking recycle stream and fractionator bottoms, is used herein having its known meaning, and refers to a highly paraffinic fraction obtained from a separation zone associated with a hydroprocessing reactor, and contains reduced N, S and Ni content relative to the reactor feed, and includes in certain embodiments hydrocarbons having an initial boiling point in the range of about 340-370° C., for instance about 340, 360 or 370° C., and an end point in the range of about 510-560° C., for instance about 540, 550, 560° C. or higher depending on the characteristics of the feed to the hydroprocessing reactor, and hydroprocessing reactor design and conditions, for instance hydrocarbons boiling in the range of about 340-560, 340-550, 340-540, 360-560, 360-550, 360-540, 370-560, 370-550, or 370-540° C. UCO is also known in the industry by other synonyms including "hydrowax." As used herein, the term "hydrocracking recycle stream" is synonymous with the terms "hydrocracker bottoms," "hydrocracked bottoms," "hydrocracker unconverted material" and "fractionator bottoms."

In accordance with the methods and systems herein, analysis of samples containing HPAHs employs aromatic-selective size exclusion chromatography. In certain embodiments, the separation mode is isocratic (using only one solvent, for example dichloromethane). The disclosed methods minimize or eliminate interference of alkylated aromatic compounds that may be present in samples. The disclosed methods are effective to determine the total concentration of HPAHs including coronene and other HPAHs such as one or more of methylcoronene, naphthenocoronene, dibenzocoronene and ovalene.

Samples suitable for the methods herein that contain HPAHs include: hydrocracker bottoms (including those derived from hydrocracking of vacuum gas oil or heavier fractions); heavy fractions from steam cracking, such as pyrolysis oil and pyrolysis tar; and/or heavy fractions from a thermal residual oil cracking process in the presence or absence of hydrogen and/or water. In certain embodiments, a prepared sample solution contains about 0.0001-0.5. 0.001-0.5, 0.01-0.5, 0.0001-0.4. 0.001-0.4 or 0.01-0.4 wt % of HPAHs. In circumstances in which a sample contains a greater amount of HPAHs, it is diluted to a concentration within the suitable ranges disclosed herein, for example with a dilution solvent, to obtain a prepared sample solution.

Figure 2:
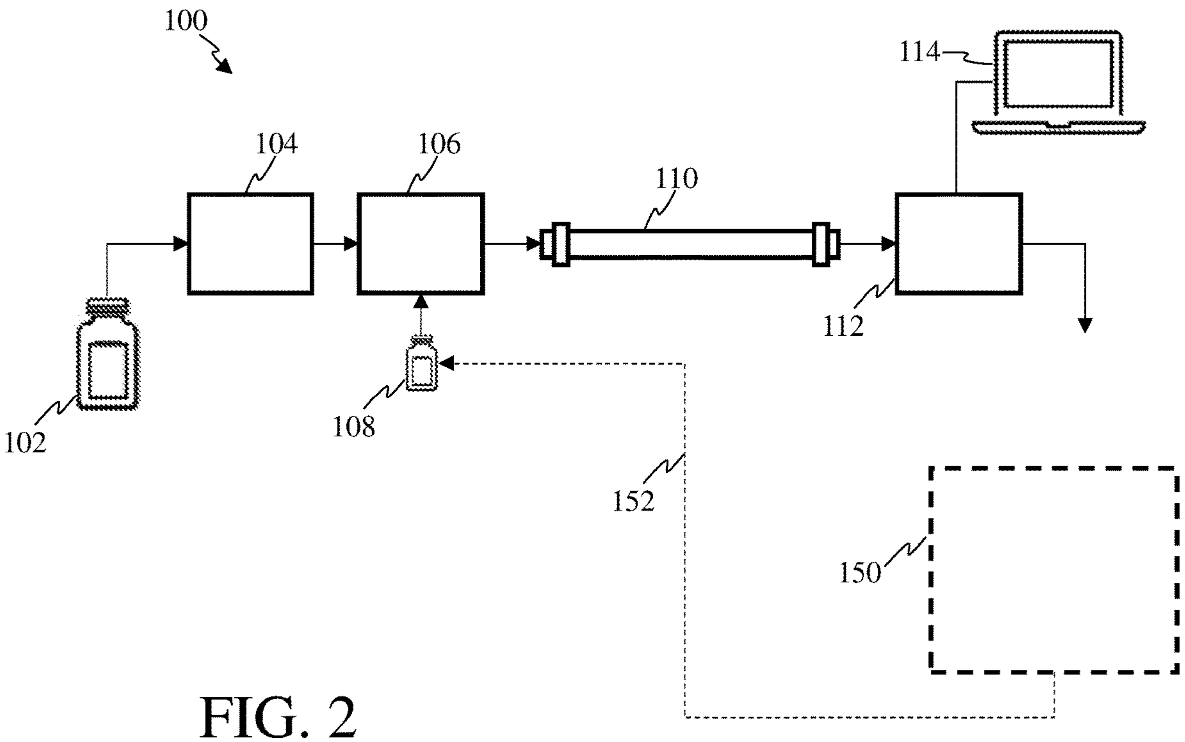
FIG. 2 is a schematic of an HPLC system suitable for use with the methods herein.

FIG. 2 is a schematic representation of an HPLC system 100 including: a source 102 of elution solvent, an HPLC pump 104, an injector 106 associated with a source 108 of a sample to be analyzed by the HPLC system 100, an HPLC column 110, an HPLC detector 112 and a computer system 114. In operation, the elution solvent 102 is pumped via the HPLC pump 104, and the injector 106 receives the pumped elution solvent and the sample 108. The elution solvent and sample form a mobile phase that is injected in the HPLC column 110 containing media as a stationary phase, whereby at least certain compounds are separated and discharged as a sample analyte to the detector 112. The detector measures responses for at least one characteristic of the sample analyte and records corresponding data via the computer system 114. The analyte is discharged as is known.

As shown in dashed lines in FIG. 2, the HPLC system 100 may be in fluid communication with a refinery system 150 via a stream 152. In certain embodiments the refinery system 150 comprises a hydrocracker unit (for example hydrocracking vacuum gas oil or heavier fractions), and the stream 152 comprises a sample of hydrocracker bottoms containing HPAHs. In certain embodiments the refinery system 150 comprises a steam cracking unit, and the stream 152 comprises a sample of pyrolysis oil or pyrolysis tar containing HPAHs. In certain embodiments the refinery system 150 comprises a thermal residual oil cracking process operating in the presence or absence of hydrogen and/or water, and the stream 152 comprises heavy fractions therefrom containing HPAHs.

The HPLC system 100 including the HPLC pump 104, the injector 106, the HPLC column 110, and the HPLC detector 112 can be one known in the art, for example, commercially available from companies including but not limited to Agilent Technologies, Waters Corporation (e.g., under the trade name Alliance), Shimadzu, and Thermo Fisher Scientific (e.g., under the trade name Vanquish). The HPLC detector may comprise one or more of an ultraviolet detector, fluorescence detector, mass spectrometer or electrochemical detector. In certain embodiments an ultraviolet detector is used as the HPLC detector and the elution solvent is transparent to ultraviolet light at least between 235-400 nm.

In certain embodiments, the dimensions of the HPLC column include a diameter in the range of about 2-10, 2-8, 2-7.8, 4.6-10, 4.6-8, 4.6-7.8, 6.5-10, 6.5-8 or 6.5-7.8 mm, for example about 2, 4.6 or 8 mm, and a length in the range of about 50-500, 50-250, 50-100, 100-500, 100-250, 150-500, 150-250 or 300-500 mm, for example about 50, 150 or 250 mm.

In certain embodiments, two or more (for instance, 2 or 3) HPLC columns are provided in series. In such embodiments, each HPLC column comprises stationary phase media. In certain embodiments a total length of HPLC columns is in the range of about 100-1000, 100-500, 100-200, 200-1000, 200-500, 300-1000, 300-500 or 600-1000 mm, for example about 100, 300 or 500 mm. In certain embodiments, the same stationary phase media may be used in plural HPLC columns. In certain embodiments, different stationary phase media may be used in plural HPLC columns. In certain embodiments, the HPLC detector 112 includes subsystems and components to carry out one or more detection methods after plural HPLC columns in series, such as after the last HPLC column in series.

In certain embodiments, the HPLC column(s) 110 are maintained in a temperature-controlled environment to maintain constant temperature over the duration of the analysis. A suitable temperature is in the range of about 20-35, 20-30, 20-25 or 30-25° C., or about 20, 25 or 30° C.

In certain embodiments, the HPLC detector 112 includes subsystems and components to carry out one or more detection methods, including but not limited to: ultraviolet; ultraviolet-visible; fluorescence; refractive index; evaporative light scattering; electrochemical charged aerosol; or mass spectrometry. In certain embodiments the HPLC detector 112 comprises an ultraviolet detector and one or more other subsystems and components to carry out another detection method. In certain embodiments ultraviolet detection is the only detection method carried out by the HPLC detector 112. In certain embodiments ultraviolet detection (alone or in combination with another detection method) is carried out in the range 235-400 nm. In certain embodiments ultraviolet detection (alone or in combination with another detection method) is carried out at 300 nm±75 nm, 325 nm±75 nm, 340 nm±75 nm, 300 nm±10 nm, 325 nm±10 nm, 340 nm±10 nm, or 380 nm±10 nm.

In certain embodiments, the mobile phase flows through the HPLC column 110 at a constant flow rate, or with an acceptable fluctuation such as +0.1 mL/min, by action of the HPLC pump 104. The HPLC pump 104 typically generates and meters a specified flow rate of the mobile phase, typically measured in milliliters per minute (mL/min) such as 0.4-1.2, 0.4-0.8, 0.4-0.6, 0.6-1.2, 0.6-0.8 or 1.0-1.2 mL/min, for instance in certain examples about 0.6, 0.8 or 1.0 mL/min. Typically, the sample is introduced in the column and mobile phase via the injector 106.

The HPLC column contains a suitable amount of media in a stationary phase through which the injected mobile phase passes through and separates. Such media is typically silica or polystyrenes possessing physiochemical properties for aromatic-selective size exclusion chromatography. Suitable dimensions for the stationary phase media include: average particle diameters in the range of about 2-11, 2-10, 2-7, 2-5, 3-11, 3-10, 3-7, 3-5, 5-11, 5-10, 5-7, 7-11 or 7-10 micrometers (μm), for example about 3, 5 or 10 μm; and average pore diameters in the range of about 40-130, 40-110, 40-70, 50-130, 50-110, 50-70 angstroms (Å), for example about 50, 100 or 120 Å.

In certain embodiments, the stationary phase media is amino functionalized to impart selectivity. In certain embodiments, amino-bonded silica particles are used as the stationary phase media, such as Eurospher II 100-5 NH2 obtained from KNAUER, Germany.

In embodiments herein, aromatic-selective size exclusion chromatography is carried out to separate molecules in a sample based on the aromaticity and size (hydrodynamic volume). Separation of aromatics in the sample is attained using media in the stationary phase that has an affinity based on aromaticity or non-aromaticity of compounds. Size exclusion is attained based on dimensional characteristics of the media, including pore size and particle dimension, and packing characteristics such as interstitial volume. In embodiments herein, the stationary phase media, also referred as a gel, comprises suitable particles that carry out the functionality of aromatic separation by affinity based on aromaticity or non-aromaticity, and simultaneously carry out the functionality of separation by size exclusion. In certain embodiments, two or more different types of stationary phase media may be used, for example, silica, amino-bonded silica and cyano-bonded silica may be mixed for enhanced selectivity.

Separation occurs when molecules of different sizes are included or excluded from the pores within the matrix. Molecules from the sample that are smaller than the pore size of the stationary phase enter the porous particles during separation and flow through channels of the stationary phase, creating a longer path to traverse and thus elute from the column later than larger molecules. Consequently, molecules separate based on their size as they pass through the column and are generally eluted in order of decreasing molecular weight.

In certain embodiments of aromatic-selective size exclusion chromatography, the stationary phase media is selected to possess molecular affinity to aromatic compounds. In this manner, when the mobile phase is injected into the column, aromatic molecules that have molecular affinity to the aromatic-selective stationary phase media elute from the column later than non-aromatic molecules. Aromatic selectively is attained since the aromatic molecules elute later. Examples of aromatic-selective stationary phase media include silica, amino-bonded silica, cyano-bonded silica and diol-bonded silica.

The elution solvent is selected to form the mobile phase with the injected sample, and has suitable characteristics compatible with the sample, stationary phase and the HPLC detector. For example, in embodiments herein using an HPAH-containing sample, in which a UV detection system is used, and in which an amino-bonded silica stationary phase is used, one or more of the following characteristics may be used to describe the elution solvent: a polarity index P' (Rohrschneider's polarity parameter) in the range of about 3 to about 4; transparency to ultraviolet light in the range of about 235 nm to about 400 nm; a dipole moment (the mathematical product D of the distance between the centers of charge in the molecule multiplied by the magnitude of the charge (at 25° C.) in the range of about 1.1 to about 1.3; a Hildebrandt solubility parameter δ ($MPa^{1/2}$) at least about 20, for example in certain embodiments in the range of about 20 to 30.

The elution solvent may comprise dichloromethane, n-propanol, isopropanol, 1,2-dichloroethane, n-butanol or a mixture comprising two or more of the foregoing. In certain embodiments, dichloromethane is a suitable elution solvent, as it is characterized by a polarity index of 3.1, a dipole moment of 1.14 D at 25° C., a Hildebrandt solubility parameter δ of at least 20, and is transparent to ultraviolet light in the range of about 235 nm to about 400 nm.

In certain embodiments, dichloromethane is used in combination with one or more other elution solvents, for example, at ratios of dichloromethane: additional solvent in the range of about 0.1:99.9 to 99.9:0.1.

In certain embodiments, dichloromethane is used in one HPLC column of a system having N columns, and one or more other elution solvents are used in other HPLC columns. In certain embodiments, dichloromethane is used in all N HPLC columns of a system having N columns. In certain embodiments, the elution solvent comprises dichloromethane. In certain embodiments, the elution solvent consists essentially of dichloromethane. In certain embodiments, the elution solvent consists of dichloromethane.

In certain embodiments, the elution solvent consists of dichloromethane and wherein separation in the HPLC column is isocratic. An isocratic mode is maintained in embodiments in which properties of the solvent or solvent mixture do not change throughout the HPLC analysis, that is, the composition of the mobile phase does not change throughout the separation. In applications in which the composition of the mobile phase does change, the mode of operation is gradient.

Figure 3:
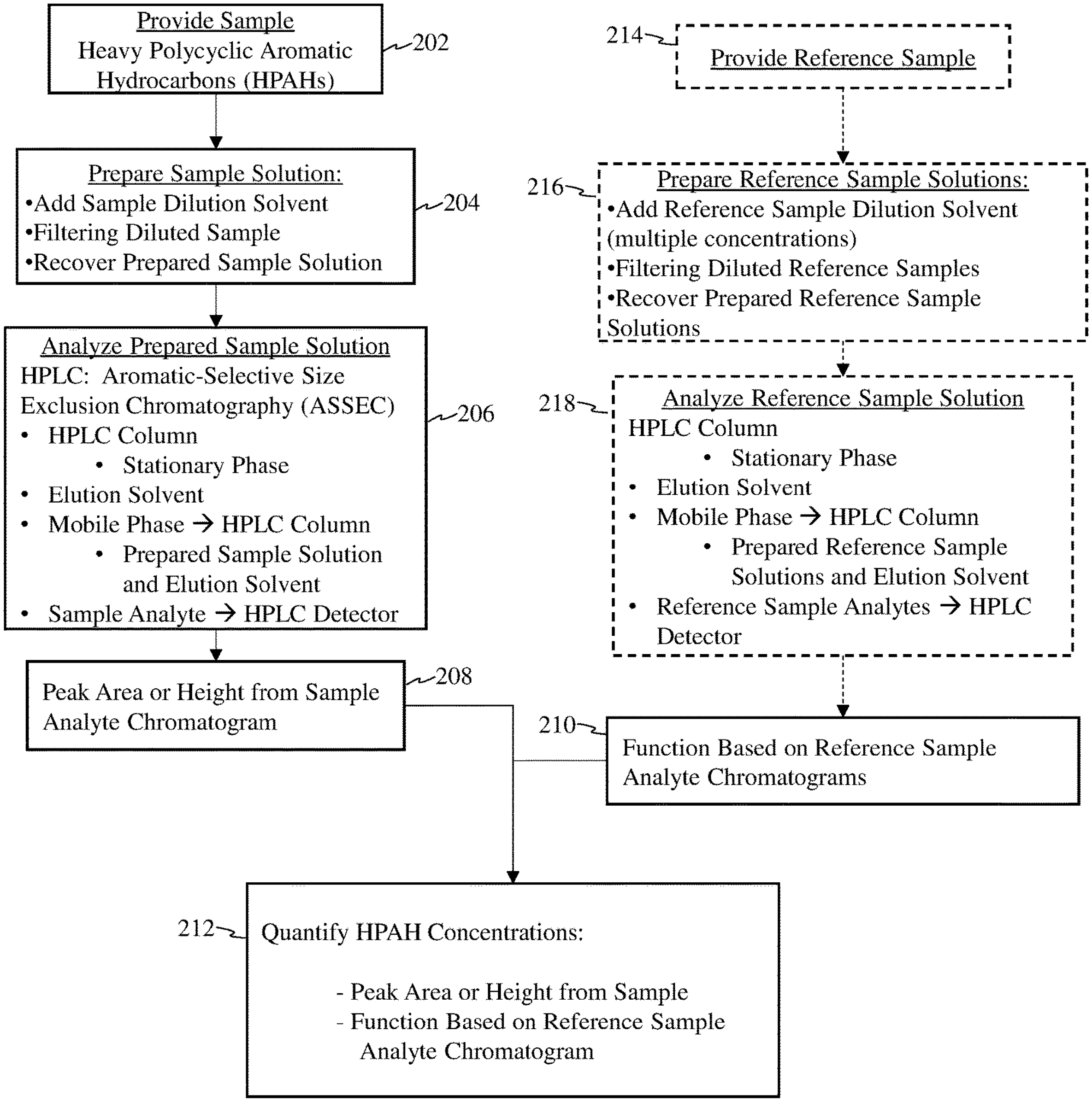
FIG. 3 is a flow chart of steps for determining HPAH concentration based on aromatic-selective size exclusion chromatography methods in embodiments herein for analysis of a sample containing HPAH(s).

FIG. 3 shows an embodiment of steps for carrying out a method according to the present disclosure. At step 202, a sample containing one or more types of HPAH compounds is provided, typically a mixture of HPAHs. At step 204, the sample is prepared by diluting it in a sample dilution solvent and filtering the diluted sample. The recovered sample (for instance provided as sample source 108 in the schematic of FIG. 2) is ready for analysis at step 206 by the HPLC (such as HPLC system 100) in particular by aromatic-selective size exclusion chromatography (ASSEC). The prepared sample is introduced in the HPLC column (such as HPLC column 110) containing a stationary phase of media together with the elution solvent (such as the elution solvent 102 pumped via the HPLC pump 104, and wherein the injector 106 receives the pumped elution solvent and the sample 108). The eluted sample analyte is analyzed by an HPLC detector (such as the HPLC detector 112). Data collected from the HPLC detector is then used to produce a sample analyte chromogram and one or more peak characteristics representative of breakthrough of HPAHs at step 208.

In addition, one or more functions or equations associated one or more peak characteristics representative of breakthrough of reference compounds from reference sample analyte chromograms are provided, referred to herein as "HPAH standards function(s)" at step 210. The HPAH standards function(s) may be developed contemporaneously with the analysis of the target samples, or at a prior time based on reference samples.

For instance, FIG. 4A, described in more detail below in conjunction with an example herein, shows chromatograms for an original hydrocracker feed, hydrocracker bottoms for which the HPAH concentration is determined (also referred to as a target sample), and a reference sample chromogram (coronene). Note that in FIG. 4A the feed chromatogram and the reference sample chromogram are provided for perspective, and are not used to determine the one or more peak characteristics representative of breakthrough of HPAHs. FIG. 4B, also described in more detail below in conjunction with an example herein, shows analyte chromatograms for reference compounds at different concentrations (e.g., coronene standards at 1 ppm, 10 ppm and 100 ppm as shown). One or more peak characteristics representative of breakthrough of the plural reference compounds are used from these chromatograms to develop a HPAH standards function based on regression analysis and the dilution factor to obtain a concentration in the same units as the concentrations of the reference compounds solutions, e.g., ppm. In certain embodiments linear regression is applied to obtain a linear fit equation, and together with the dilution factor, form the HPAH standards function. In certain embodiments polynomial regression is applied to obtain a polynomial equation such a second degree polynomial equation, and together with the dilution factor, form the HPAH standards function.

In certain embodiments, the regression equation of the HPAH standards function provided at step 210 is developed using the same HPLC system that is used for analysis of the target sample(s). As shown in FIG. 3, these steps 214, 216 and 218 are optional (as indicated in dashed lines). For example, one or more these steps may be avoided. In embodiments in which a HPAH standards function based on reference sample analyte chromograms from empirical data or prior analyses, none of steps 214, 216 and 218 are necessary or required to be practiced. In embodiments in which prepared reference samples are available, steps 214 and 216 can be avoided.

In embodiments in which one or more of steps 214, 216 and 218 are practiced, at step 214, a reference sample is provided containing one or more known types of HPAH compounds. At step 216, the reference sample is prepared by diluting it in a reference sample dilution solvent and filtering the diluted reference sample. The recovered reference sample (for instance provided as a reference sample source 108 in the schematic of FIG. 2) is ready for analysis at step 218 by the HPLC (such as HPLC system 100) by ASSEC. The prepared reference sample is introduced in the HPLC column (such as HPLC column 110) containing a stationary phase of media together with the elution solvent (such as the elution solvent 102 pumped via the HPLC pump 104, and wherein the injector 106 receives the pumped elution solvent and the reference sample via source 108). The eluted reference sample analyte is analyzed by an HPLC detector (such as the HPLC detector 112).

The sample dilution solvent can be cyclohexane, or another suitable solvent or combination of solvents with suitable properties. For example, a suitable elution solvent is characterized by: a polarity index less that that of the elution solvent (e.g., dichloromethane) so that the elution solvent can elute the adsorbed HPAHs from the HPLC column; is not apolar (e.g., such as pentane, hexane or heptane) to facilitate solubility of the HPAHs; and transparency to ultraviolet light. The diluted sample can have a concentration of the sample relative to the total mass of the prepared sample in the range of about 1-12, 1-10, 1-8, 2-12, 2-10, 2-8, 4-12, 4-10 or 4-8 wt %, such as about 6, 8 or 10 wt %.

The reference sample comprises a known HPAH compound. In certain embodiments, the reference sample comprises coronene. In certain embodiments, the reference sample consists essentially of coronene. In certain embodiments, the reference sample consists of coronene. The reference sample dilution solvent can be a suitable HPLC dilution solvent, such as a solvent suitable as dilution solvent for the target sample including cyclohexane mentioned hereinabove. The diluted reference sample can have a concentration of the reference sample relative to the total mass of the prepared reference sample in the range of about 1-12, 1-10, 1-8, 2-12, 2-10, 2-8, 4-12, 4-10 or 4-8 wt %, such as about 6, 8 or 10 wt %.

At step 212, the sample analyte chromogram is analyzed to identify the breakthrough times of HPAHs at a peak. One or more characteristics of the peak(s) is calculated, for example, peak height and/or peak area. The peak area and/or height is then used to quantity the HPAH concentration in the target sample using the standard function(s) developed based on chromograms of the reference samples. For example, the quantitation of HPAHs can be achieved by preparing calibration standards of different concentrations (1 ppm, 10 ppm, and 100 ppm) of coronene and measuring the response from the UV detector (peak height or peak area); developing a linear calibration plot for coronene; quantitate the amount of HPAHs in the sample relative to coronene based on the plot, and presenting that as a weight percentage (accounting for the dilution factor of the sample).

The HPAH concentration obtained by the present method may be used to alleviate the impact of HPAH on process performance. For example, HPAH concentration in a hydrocracker bottoms stream from a hydrocracking process, a pyrolysis oil stream from a steam cracking process, and/or heavy fractions from a thermal residual oil cracking process in the presence or absence of hydrogen and/or water, can be monitored as needed or on a periodic basis using the method of the present disclosure, and appropriate adjustments may be made to those processes to maintain HPAHs at a level suitable for the operations.

EXAMPLE

A method based on aromatic-selective size exclusion chromatography (ASSEC) is used for the separation of heavy polycyclic aromatic hydrocarbons from polycyclic aromatic hydrocarbons using amino-bonded silica phase and detection using an Agilent 1200 HPLC system with a binary pump, a degasser, an auto sampler and a diode array detector set to record UV spectra from 200 nm to 400 nm. Instrument control, data recording, and data analyses were performed using Chemstation software, Agilent Technologies. Two HPLC columns (250×8 mm) packed with Eurospher II 100-5 $NH_2$, obtained from KNAUER, Germany, were connected in series. The average particle size and pore diameter for the silica packing material were 5 μm and 100 Å, respectively. The following conditions were maintained: mobile phase: dichloromethane, column oven temperature: 30° C., flow rate: 0.8 mL/min and run time: 30 min.

The chromatograms herein are presented as known those skilled the art, for instance, with intensity on the y-axis plotted against elution time on the x-axis. For clarity of disposition, an initial time of approximately 15 minutes is not shown, as the intensity is essentially the same for all analytes herein.

Figure 4A:
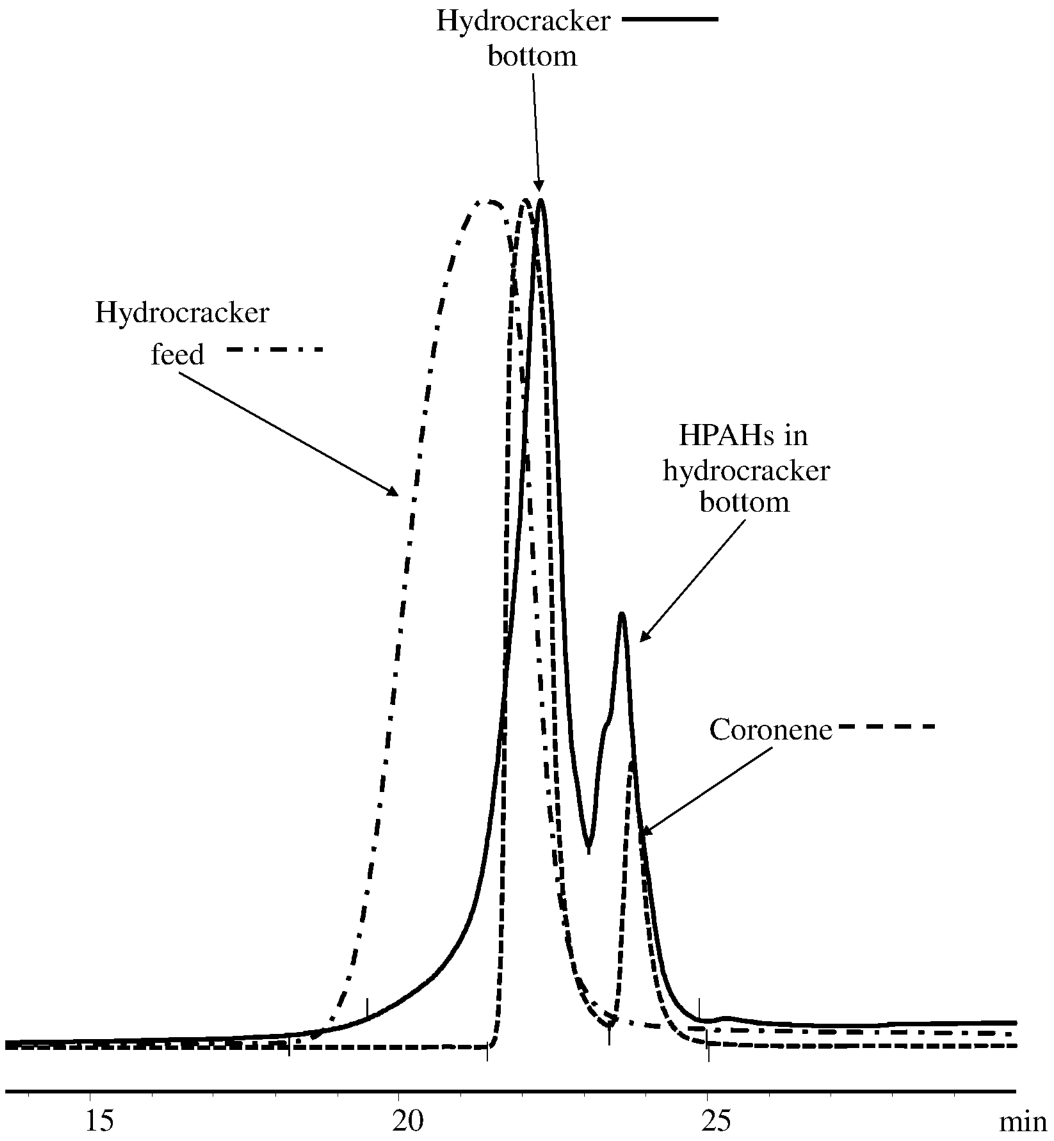
FIG. 4A is a plot showing chromatograms of a hydrocracker bottoms stream as a sample analyte, a reference sample and hydrocracker feed.
Figure 4B:
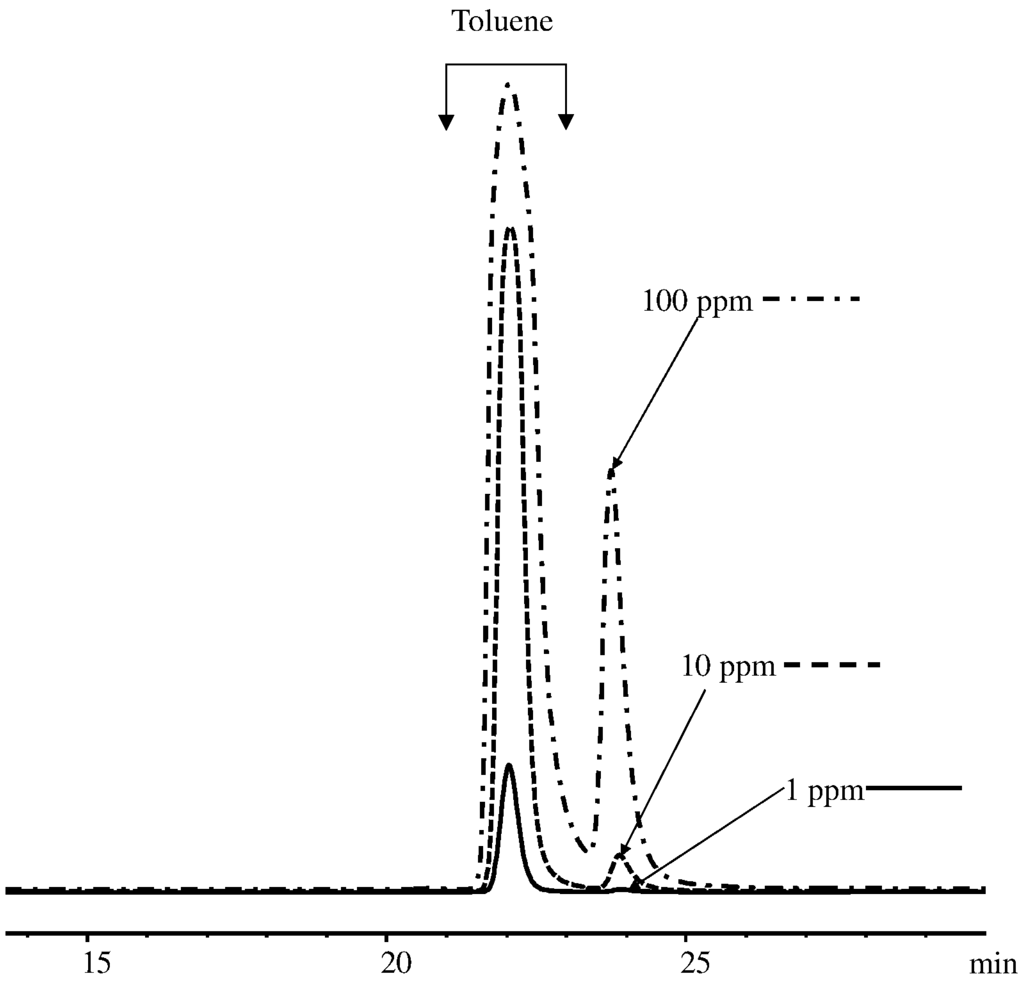
FIG. 4B is a plot showing chromatograms of solutions of reference sample at various concentrations.

The chromatogram of a hydrocracker bottom samples containing HPAHs is provided in FIG. 4A. A measured amount of the sample (hydrocracker bottom)) was diluted in cyclohexane (wt./wt.: 1/10, a dilution factor of 10) before being filtered using a 0.2 μm syringe filter. The diluted sample was injected into the HPLC system. FIG. 4A also shows hydrocracker feed sample prepared as a secondary reference solution, and also a 100 ppm coronene standards, both for reference and optional in this figure. In the example herein, the peak area obtained from the chromatogram of the hydrocracker bottom samples in FIG. 4A was determined to be 3393.5.

Chromatograms of the coronene standards at different concentrations are shown in FIG. 4B. The toluene peak is also identified for reference. Coronene standard solutions were prepared in a baseline compound different concentrations of 1, 10 and 100 ppm coronene, where the 1 and 10 ppm coronene standard solutions were in a baseline compound of xylene and the 100 ppm standard was in a baseline compound of in toluene. The chromograms of FIG. 4B are based on operation using the same conditions as in the sample solution containing HPAHs to be analyzed, except that the injection volume was 10 μL.

Figure 4C:
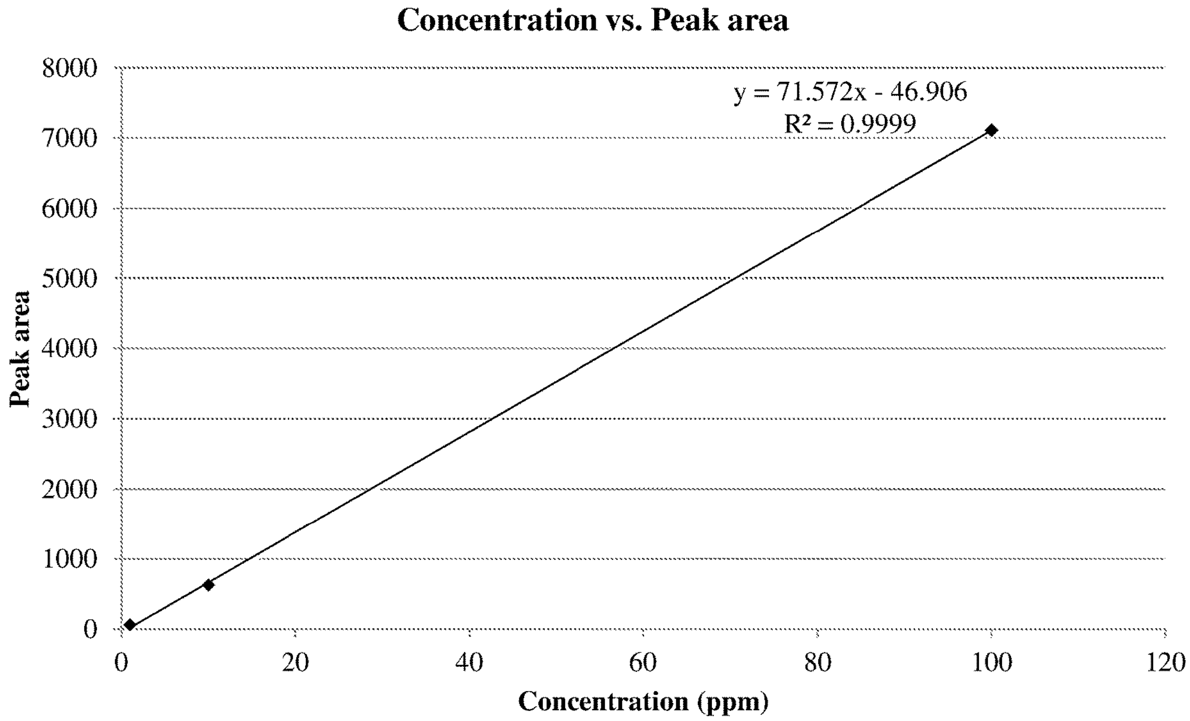
FIG. 4C is a plot of concentration against peak area for the standard solutions in FIG. 4B.

The peak areas obtained from the chromatogram of the coronene standards FIG. 4B were determined to be 62.5 (1 ppm), 627.2 (10 ppm) and 7114.1 (100 ppm). This data was plotted as shown in FIG. 4C to develop a HPAH standards function: $y=71.572x-46.906$, which has a coefficient of determination $R^2$ of 0.9999. The value "x" is calculated by substituting sample peak area of 3393.5 for "y," and the concentration obtained by multiplying by the dilution factor (10), x=48.28 and thus HPAH concentration=482.8 ppm.

Figure 5:
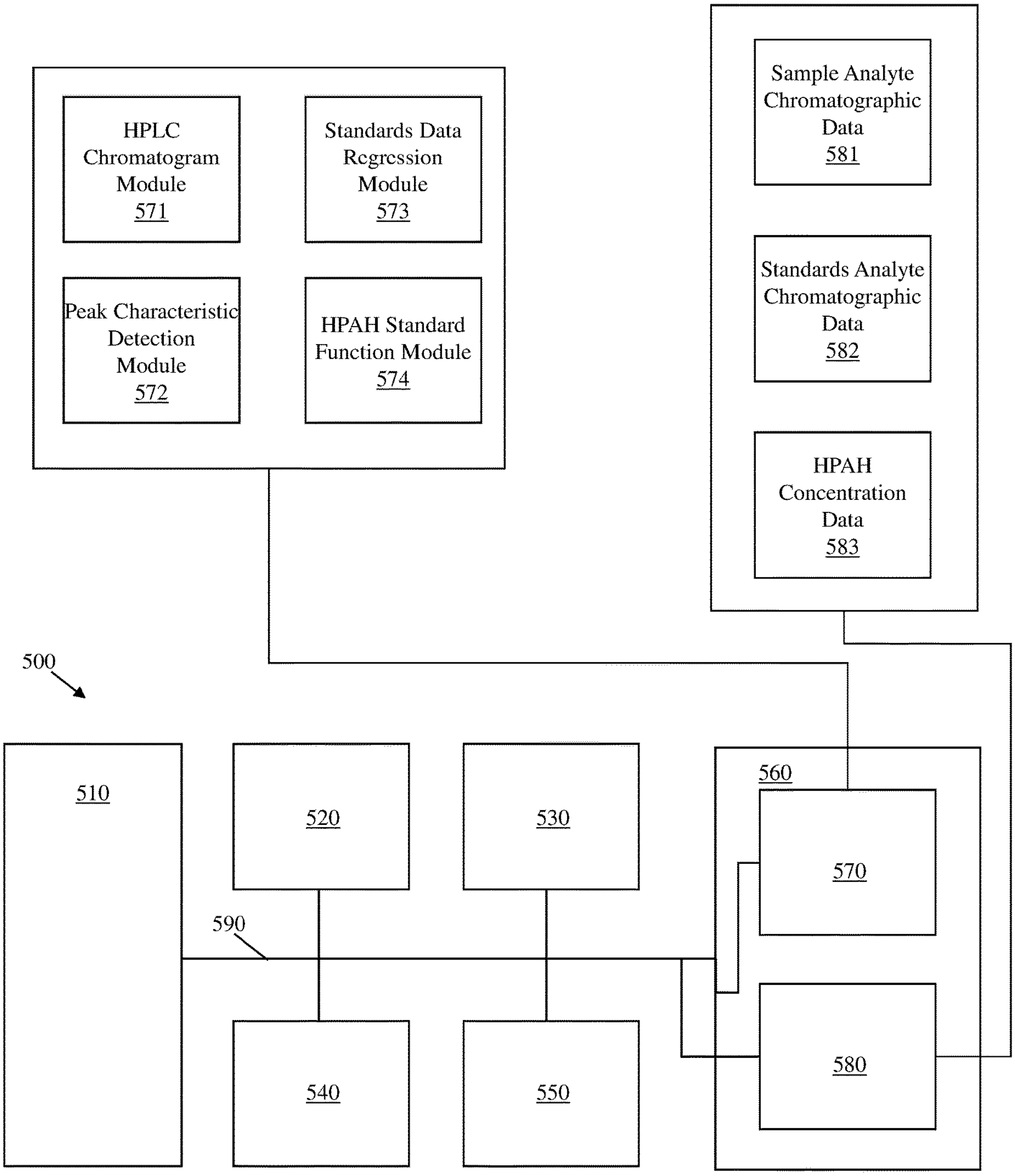
FIG. 5 is a block diagram of an embodiment of a computer system for implementing the systems and methods herein.

FIG. 5 shows an exemplary block diagram of a computer system 500 in which one embodiment of the present invention can be implemented. Computer system 500 includes a processor 520, such as a central processing unit, an input/output interface 530 and support circuitry 540. In certain embodiments, where the computer system 500 requires a direct human interface, a display 510 and an input device 550 such as a keyboard, mouse, pointer, motion sensor, microphone and/or camera are also provided. The display 510, input device 550, processor 520, and support circuitry 540 are shown connected to a bus 590 which also connects to a memory 560. Memory 560 includes program storage memory 570 and data storage memory 580. Note that while computer system 500 is depicted with direct human interface components display 510 and input device 550, programming of modules and exportation of data can alternatively be accomplished over the input/output interface 530, for instance, where the computer system 500 is connected to a network and the programming and display operations occur on another associated computer, or via a detachable input device as is known with respect to interfacing programmable logic controllers.

Program storage memory 570 and data storage memory 580 can each comprise volatile (RAM) and non-volatile (ROM) memory units and can also comprise hard disk and backup storage capacity, and both program storage memory 570 and data storage memory 580 can be embodied in a single memory device or separated in plural memory devices.

Program storage memory 570 stores software program modules and associated data and stores modules including but not limited to: a HPLC chromatogram module 571, having one or more software programs adapted to obtain data from the HLPC detector and produce a chromatogram as described herein; a peak characteristic detection module 572, having one or more software programs adapted to determine from a chromatogram produced herein (e.g., obtained with module 571) one or more peak characteristics such as peak area and/or peak height; a standards data regression module 573 having one or more software programs adapted to analyze one or more peak characteristics of plural standards reference samples (e.g., obtained with module 572) and develop a HPAH standards function; and an HPAH standard function module 574 that uses the developed HPAH standards function (e.g., developed with module 573) and the peak characteristic(s) of the target sample (e.g., obtained with module 572) and determine HPAH concentration of the target sample. It is to be appreciated that the functions of one or more of these modules may be combined into fewer modules, or divided into additional modules.

Data storage memory 580 stores results and other data generated by the one or more program modules of the present invention, including but not limited to sample analyte chromatographic data 581 representative of the target samples; standards analyte chromatographic data 583 representative of the standards reference solutions; and HPAH concentration data 583 representative of the calculated concentrations of the target samples.

It is to be appreciated that the computer system 500 can be any computer such as a personal computer, minicomputer, workstation, mainframe, a dedicated controller such as a programmable logic controller, or a combination thereof. While the computer system 500 is shown, for illustration purposes, as a single computer unit, the system can comprise a group of computers which can be scaled depending on the processing load and database size.

Computer system 500 generally supports an operating system, for example stored in program storage memory 570 and executed by the processor 520 from volatile memory. According to an embodiment of the invention, the operating system contains instructions for interfacing computer system 500 to the Internet and/or to private networks.

In embodiments, the present invention can be implemented as a computer program product for use with a computerized computing system. Those skilled in the art will readily appreciate that programs defining the functions of the present invention can be written in any appropriate programming language and delivered to a computer in any form. Portions of the methods described herein can be performed by software or firmware in machine readable form on a tangible or non-transitory storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

As generally illustrated herein, the system embodiments can incorporate a variety of computer readable media that comprise a computer usable medium having computer readable code means embodied therein. One skilled in the art will recognize that the software associated with the various processes described can be embodied in a wide variety of computer accessible media from which the software is loaded and activated. Pursuant to *In re Beauregard,* 35 U.S.P.Q.2d 1383 (U.S. Pat. No. 5,710,578), the present invention contemplates and includes this type of computer readable media within the scope of the invention. In certain embodiments, pursuant to *In re Nuijten,* 500 F.3d 1346 (Fed. Cir. 2007) (U.S. patent application Ser. No. 09/211,928), the scope of the present claims is limited to computer readable media, wherein the media is both tangible and non-transitory.

It is to be understood that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

Unless otherwise defined, all technical and scientific terms used herein have the same meaning as commonly understood by one of ordinary skill in the art to which this invention belongs. In case of conflict, the present specification, including definitions, will control. Although methods and materials similar or equivalent to those described herein can be used in the practice or testing of embodiments of the present invention, suitable methods and materials are described below. In addition, the materials, methods, and examples are illustrative only and not intended to be limiting.

When an amount, concentration, or other value or parameter is given as either a range, preferred range or a list of upper preferable values and/or lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Notably, the figures and examples above are not meant to limit the scope of the present disclosure to a single implementation, as other implementations are possible by way of interchange of some or all the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

We claim:

1. A method for separation and quantitation of heavy polycyclic aromatic hydrocarbons (HPAHs) in a sample comprising:

providing the sample containing HPAHs, wherein HPAHs comprise polycyclic aromatics with at least 7 aromatic rings;

diluting the sample in a sample dilution solvent by a dilution factor and filtering the diluted sample to recover a prepared sample solution;

analyzing the prepared sample solution with a high-performance liquid chromatography (HPLC) system for aromatic-selective size exclusion chromatography (ASSEC), wherein the HPLC system comprises one or more HPLC columns packed with a stationary phase selected from the group consisting of silica, amino-bonded silica, and cyano-bonded silica, an elution solvent, and an HPLC detector;

wherein ASSEC includes introducing a mobile phase of the injected prepared sample solution and the elution solvent into the HPLC column, flowing the mobile phase through the stationary phase for separation of HPAHs through the HPLC column based on molecular affinity relative to the stationary phase and based on size exclusion relative to the pore dimensions and particle size of the stationary phase and relative to interstitial volume of the HPLC column, discharging sample elute as a sample analyte and measuring responses for at least one characteristic of the sample analyte with the HPLC detector, and obtaining a chromatogram of the sample analyte based on the measured responses by the HPLC detector;

identifying one or more peaks of the chromatogram of the sample analyte associated with HPAH compounds;

calculating a peak characteristic from the one or more peaks of the chromatogram of the sample analyte associated with HPAH compounds;

quantitating HPAHs in the sample containing HPAHs with a HPAH standards function obtained from regression of peak characteristics of plural reference HPAH standard solutions each having a reference HPAH compound comprising coronene, and using the peak characteristic and the dilution factor.

2. The method of claim 1 wherein the HPAHs comprise polycyclic aromatics with 7-50 aromatic rings.

3. The method of claim 1, wherein the HPAH standards function is determined obtaining HPLC chromatograms of the plural reference HPAH standard solutions at different concentrations, calculating standard peak characteristics from one or more peaks associated with the reference HPAH compound in each of chromatograms at different concentrations, and performing regression on the standard peak characteristics.

4. The method of claim 3, wherein the HPAH compounds in the sample comprise coronene and one or more additional polycyclic aromatics with at least 7 aromatic rings, and wherein the reference HPAH compound consists essentially of coronene.

5. The method of claim 4, wherein the different concentrations comprise at least two or three of 1 ppm, 10 ppm, and 100 ppm of refence sample relative to a refence sample dilution solvent.

6. The method of claim 5, wherein the regression is linear regression.

7. The method of claim 1, wherein the stationary phase is cyano-bonded silica.

8. The method of claim 1, wherein the stationary phase is amino-bonded silica.

9. The method of claim 1, wherein the sample peak characteristics and the standard peak characteristics comprise peak area.

10. The method of claim 1, wherein the sample peak characteristics and the standard peak characteristics comprise peak height.

11. The method of claim 1, wherein the elution solvent has a polarity index (Rohrschneider's polarity parameter) in the range of about 3 to about 4.

12. The method of claim 1, wherein the HPLC detector is an ultraviolet detector and the elution solvent is transparent to ultraviolet light at least between 235-400 nm.

13. The method of claim 1, wherein the elution solvent has a dipole moment in the range of about 1.1 to about 1.3 D at 25° C.

14. The method of claim 1, wherein the elution solvent has a Hildebrandt solubility parameter δ of at least about 20.

15. The method of claim 1, wherein the elution solvent comprises dichloromethane.

16. The method of claim 15, wherein separation in the HPLC column is isocratic.

17. The method of claim 1, wherein the sample comprises hydrocracker bottoms derived from hydrocracking.

18. The method of claim 1, wherein the sample comprises pyrolysis oil or tar from steam cracking.

19. The method of claim 1, wherein the sample comprises a heavy fraction from a thermal residual oil cracking process that operates in the presence or absence of hydrogen and/or water.

20. The method of claim 1, wherein the stationary phase is silica.

* * * * *